3,116,712
CLOSED CYCLE FISH REARING SYSTEM
Hubert S. Ogden and Stanley Dee Ogden, both of 4214 Santa Monica Blvd., Los Angeles 29, Calif.
Filed Oct. 19, 1962, Ser. No. 231,701
5 Claims. (Cl. 119—3)

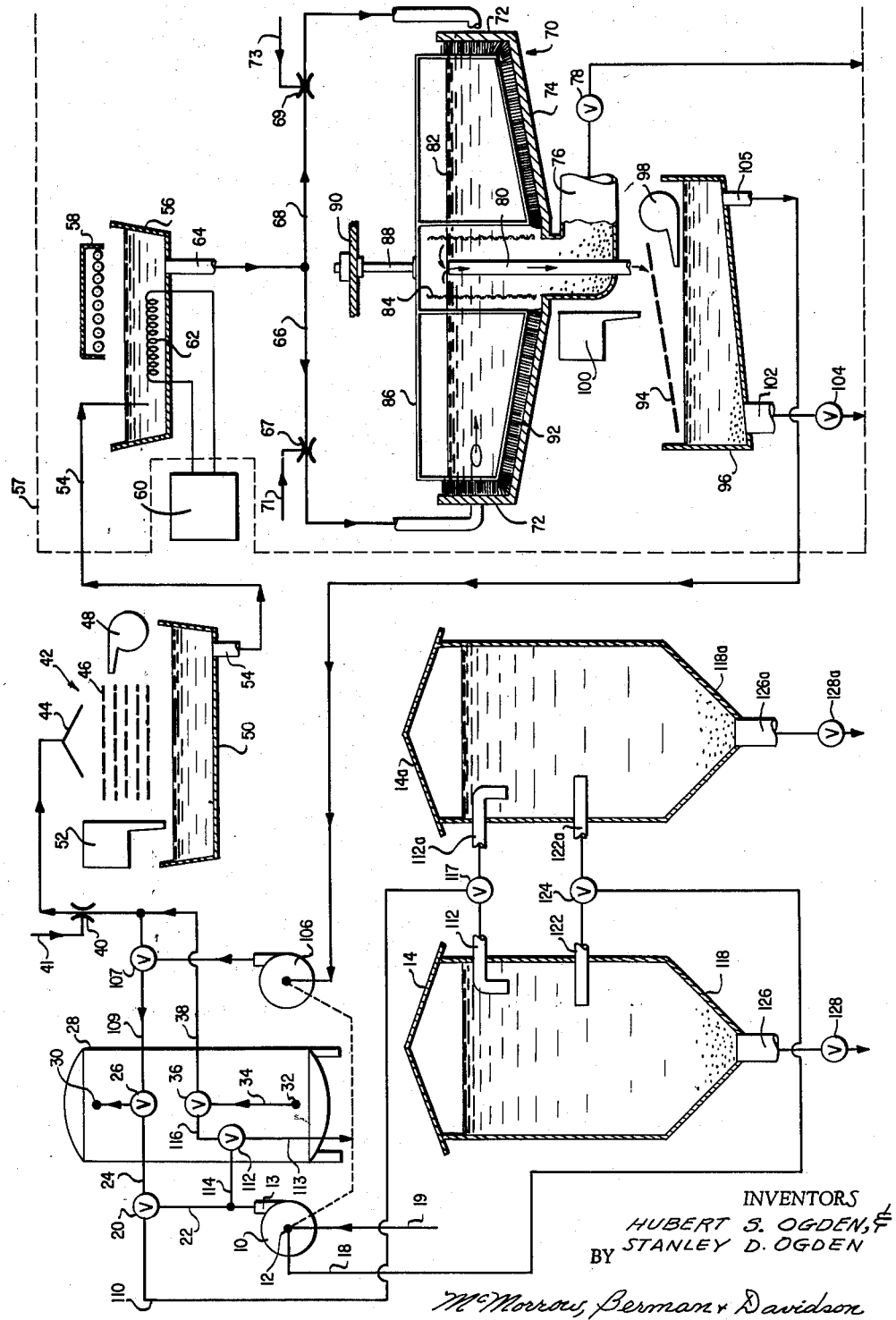

This invention relates generally to a closed cycle fish rearing system and, more particularly, to such a system incorporating improved water purification and circulation means rendering the system suitable for the rearing and holding of trout and other fresh water fish.

In the past, it has always been necessary to locate trout and other fish hatcheries near an abundant supply of fresh, clean water having the proper temperature and correct physical and chemical properties.

Enormous amounts of water are presently being used by most hatcheries since this water flows through their basins and then is usually discharged as waste without being reused or recovered. Since the quality and quantity of available water can suddenly change without warning, such a change may permanently damage the existing stock of fish and in many cases cause a complete shut down or relocation of the entire hatchery.

Therefore, the principal object of this invention is to provide a closed cycle fish rearing system wherein the same water is recirculated continuously throughout the system and is purified through a continuous process whereby all objectionable soils and dissolved toxic matter are removed.

Another object of the invention is to remove or destroy organisms in the water for the purpose of reducing or preventing water-borne infections and diseases in the fish.

Another object of this invention is to maintain a high oxygen residual in the water at all times.

A more specific object of this invention is to remove the carbon dioxide, ammonia, uric acid or urea, chlorine, manganese, nitrates, nitrites and other dissolved materials which may be toxic to the fish.

A further object of this invention is to recover the water which is used to backwash the filter contained in the system.

Still another object of this invention is to provide a self-cleaning holding tank for the fish.

A still more specific object of this invention is to provide the self-cleaning fish tank with cleaning means which is actuated by the force of the water flowing through the system.

Other objects and advantages of this novel closed cycle fish rearing system will become apparent from the following description and accompanying drawing of a preferred embodiment of this invention.

In the drawing:

The figure is a semi-schematic diagram showing a closed cycle fish rearing system embodying this invention.

As shown in the drawing, this closed cycle fish rearing system includes a pump 10 having an inlet 12 which floods the system with water from either of the storage tanks 14 and 14a through a pipe 18. Inlet 12 is also connected via a pipe 19 to a source (not shown) of fresh water in order to add to the system any water which maybe lost during the removal of waste material, evaporation, etc.

The outlet 13 of pump 10 is connected to a three-way valve 20 which is normally positioned to permit water to flow through pipes 22 and 24 to another three-way valve 26 which is initially positioned to allow the water to flow into the top of a filter tank 28 via an inlet 30 thereof.

The water flows downwardly through filter 30 and exists at the bottom through the outlet 32. From there, the water is conducted via pipe 34 to a three-way valve 36 which is normally positioned to conduct the water through pipe 38 which carries the water up to an air injector 40 which aerates the water flowing in pipe 38. The injector 40 has an inlet pipe 41 which may be connected to a suitable source of air.

The aerated water is then fed to the top of a spray tower 42. The water is discharged by the spray head 44 and falls by gravity through the baffles 46 which break the water into small particles so that they may be saturated with air forced through the particles by a large volume blower 48. The large volume of air saturates the water with oxygen and at the same time helps to dissipate any excess amount of carbon dioxide which may be dissolved in the water. The aerated water is then collected in a tank 50 above which is mounted a chemical feeder 52 of the drip type which adds non-toxic chemicals to the water in tank 50 in order to kill harmful bacteria and decontaminate the water.

The water in tank 50 flows by gravity via pipe 54 to another tank 56. Actually, tank 56 is located below tank 50 within an enclosure 57 even though in order to conserve space and provide greater detail in the drawing, the tank 56 is shown at a higher level than tank 50.

Mounted about tank 56 is an ultra-violet lamp 58 for irradiating the water within the tank. This ultra-violet radiation maintains a practically sterile condition in the water and prevents the growth and development of harmful bacterial contamination. The ultra-violet radiation also helps break down the organic byproducts of the fish into removable and adsorbable compounds.

A heat exchanger including a refrigeration unit 60 located outside enclosure 57 and a cooling coil 62 located in tank 56 maintains the water at the proper temperature.

The water in tank 56 flows by gravity through a pipe 64 which divides into two feeder pipes 66 and 68 which feed water to a fish rearing and holding tank 70. An air injector 67 having an air inlet pipe 71 aerates the water in feeder pipe 66 and an air injector 69 having an air inlet pipe 73 aerates the water in feeder pipe 69. Pipes 66 and 68 enter tank 70 at diametrically opposite points of the tank and inject the water into the tank substantially tangentially to its circular wall 72. Such an arrangement imparts a circular motion to the water in tank 70. The bottom 74 of tank 70 is substantially dish-shaped and has a waste discharge sump 76 in the center thereof. A dump valve 78 may be opened to discharge the waste accumulated in the sump.

Also disposed in the center of tank 70 is a stand pipe 80 through which the water 82 flows when it reaches the top thereof. A generally cylindrical screen 84 is placed around stand pipe 80 and extends slightly thereabove in order to prevent fish from entering the stand pipe. Screen 84 is mounted a short distance above the bottom 74 of tank 70 in order to allow solid waste materials to enter sump 76 centrally disposed in the bottom of the tank.

Since the feed pipes 66 and 68 direct water into tank 70 substantially tangentially to the wall 72, rotary motion is imparted to the water. Such motion produces the well known effect of gradual movement of solids to the center of the tank 70 where they flow under screen 84 into sump 76. In order to accentuate the natural movement of solids in suspension to the center of tank 70, a mechanical scrubber 86 is fixed to a vertical shaft 88 which is journaled in a bearing plate 90 to permit easy rotation of the scrubber. Scrubber 86 is fitted along its vertical and bottom sides with soft bristles 92 which press lightly against the inner periphery of wall 72 of the tank 70 and also against the bottom 74 of the tank. The rotary movement of the water in tank 70 impinges against the exposed surfaces of scrubber 86 and force it to rotate, thereby scrubbing the wall and bottom of tank 70 to aid in the removal of solid materials.

Water overflowing through stand pipe 80 flows by gravity over a riffling pan 94 into a sump and settling tank 96. Another high volume air blower 98 saturates the falling water with oxygen in the same manner as accomplished by blower 58. Another chemical feeder 100 of the drip feed type adds additional non-toxic chemical bactericides and decontaminants to the water in tank 96. An outlet 102 permits the discharge of waste material from tank 96 when the dump valve 104 is opened.

The water in tank 96 flows out through a pipe 105 and flows by gravity into a circulating pump 106 which pumps the water up to a valve 107 which is positioned to communicate with a pipe 109 connected to valve 26 which is now in its normal recirculating position so that the water flows through valve 26 into the inlet 30 of filter tank 28. Pump 10 and 106 may be mechanically driven by a common means. In actual practice, pump 106 is located at a lower lever than settling tank 96, even though in the drawing pump 106 is shown above tank 96. Periodically, filter 28 must be backwashed in order to remove solids and suspended material which were removed from the water during the normal purification cycle just described. The storage tanks 14 and 14a are used for this backwashing operation.

In order to operate in the backwash cycle, three-way valve 20 is operated to its second position to provide communication between the pipe 24 and a pipe 110. Of course, with valve 20 in this position, the outlet of pump 10 no longer communicates with pipe 24. However, another valve 112 is positioned so that the outlet of pump 10 is connected via a pipe 114 and valve 112 through a pipe 116 to the three-way valve 36 which is also now turned to its second position so that pipe 116 communicates with the filter outlet 32 via pipe 34. In other words, water is now circulated by pump 10 in the reverse direction through filter 28. Valve 112 also has a position which allows waste to be discharged via a pipe 113.

This backwash water dislodges the solid materials held in the filter elements of filter 28 and is pumped out of the filter inlet 30 and through to the three-way valve 26 which has also been moved to a second position so that inlet 30 communicates with pipe 24. It can be seen therefore that in this backwash cycle the water flows in the reverse direction through filter 28 by entering the outlet 32 and exiting through inlet 30 from where it is pumped through pipe 24, valve 20 and pipe 110 to a three-way valve 117. In one position of valve 117, water flows through a pipe 112 into tank 14 and in the other position, through a pipe 112a into tank 14a.

In order to quickly settle out the suspended matter which is present in the backwash water contained in tank 14, for example, and also to sterilize this water for further usage, heavy doses of chlorine are first added, followed by an alum solution to form a flock which settles rapidly carrying the suspended matter down into the conically shaped bottom 118 of tank 14.

After the water has been so treated, the necessary valves are returned to their normal positions and the purified water is returned to the system by being pumped through pipe 122, another three-way valve 124 and pipe 18 to the inlet 12 of pump 10.

The storage tank 14a may be alternated with storage tank 14 by operating three-way valve 117 to its alternate position so that pipe 110 communicates with pipe 112a instead of with pipe 112. The backwash is then pumped to storage tank 14a, is treated, and then is recirculated through pipe 122a and valve 124 which is now positioned to permit water to flow from pipe 122a through pipe 18 to the inlet 12 of pump 10.

Outlets 126 and 126a are provided in the bottom of the tanks 14 and 14a, respectively, which are provided with corresponding dump valves 128 and 128a in order to permit the suspended solid material to be emptied periodically from the storage tanks.

During the repeated cycling of the water through the system, the water may become highly contaminated due to the presence of fecal matter, urine and decomposed food particles, thereby resulting in highly contaminated water which may be toxic to the fish.

By the combined use of ultra-violet radiation, a catalyst and suitable chemical additives, such material may be precipitated from the water.

By feeding a low solubility calcium solution into the system, irradiating the water with high intensity ultra-violet lamps, aerating the water excessively, and using a suitable catalyst in filter 28, ammonia, nitrogen, and nitrite nitrogen products may be continuously removed as insoluble precipitates.

There has been described a novel closed cycle fish rearing system which provides a completely closed system of operation and purification of the water used for fish rearing or holding, whereby this same water is recirculated continuously and is purified through a continuous process so that all objectionable solids and dissolved matter are continuously removed with sufficient rapidity to prevent toxicity in the fish.

Various modifications and improvements in the preferred embodiment of a novel closed cycle fish rearing system as just described will be apparent to those skilled in the art and are considered to be within the purview of this invention, the scope of which is intended to be limited only as defined in the appended claims.

What is claimed is:

1. A closed cycle fish rearing and water circulation system comprising:
   (a) pump means for circulating water through said system,
   (b) mechanical filter means connected to said pump means,
   (c) a spray tower connected to said mechanical filter means,
   (d) means for irradiating with ultra-violet light the water flowing from said spray tower,
   (e) a fish rearing tank for holding the irradiated water,
   (f) overflow means associated with said fish tank,
   (g) a settling tank for holding overflow water from said fish tank including a bottom,
   (h) means therein for removing sediment from said settling tank,
   (i) means for feeding the water in said settling tank to said mechanical filter means,
   (j) means for aerating the water flowing through said system, and
   (k) means for adding a chemical bactericide to the water flowing through said system.

2. A closed cycle fish rearing system as defined in claim 1 wherein said fish tank has a generally circular wall and a dish-shaped bottom and further comprising conduit means for feeding the irradiated water into said fish tank substantially tangentially to said wall.

3. A closed cycle fish rearing system as defined in claim 2 further comprising scrubber means rotatably mounted within said fish tank and actuated by the force of the water entering said tank through said conduit means.

4. A closed cycle fish rearing and water circulation system comprising:
   (a) a first pump for circulating water through said system and having first and second inlets and an outlet,
   (b) a filter having an inlet and an outlet,
   (c) first conduit means connecting said pump outlet to said filter inlet,
   (d) a spray tower,
   (e) second conduit means interconnecting the outlet of said filter and said spray tower,
   (f) means to inject air into water flowing through said second conduit means,
   (g) a first tank associated with said spray tower, the water flowing by gravity through said tower into said first tank, (h) means to blow air through the water falling through said tower, (i) means for adding a chemical de-contaminant to said first tank, (j) a second tank connected to said first tank so that water flows by gravity from said first to said second tank, (k) an ultra-violet lamp mounted above said second tank for irradiating the water contained therein, (l) means for cooling the water contained in said second tank, (m) a fish rearing tank, (n) third conduit means for allowing water to flow by gravity from said second tank to said fish rearing tank, (o) means to inject air into the water flowing through said third conduit means, (p) an overflow pipe in said fish tank, (q) a screen surrounding said overflow pipe, (r) valve means for removing sediment from the bottom of said fish tank, (s) a sump and settling tank disposed beneath said fish tank so that water flows by gravity through said overflow pipe to said sump and settling tank, (t) means for blowing air through the water flowing into said sump and settling tank, (u) means for adding a chemical de-contaminant to said sump and settling tank, (v) valve means for removing sediment from the bottom of said sump and settling tank, and (w) a second pump for pumping water from said sump and settling tank to said inlet of said filter.

5. A closed cycle fish rearing system as defined in claim 4 further comprising:

(a) a valve means for connecting said first pump outlet to said filter outlet to force backwash water in the reverse direction through said filter to said filter inlet, (b) a backwash water storage and treatment tank, (c) valve means connected between said filter inlet and said storage tank for directing backwash water to said storage tank, and (d) valve means for removing sediment from the bottom of said storage tank.

References Cited in the file of this patent

UNITED STATES PATENTS

| | | |
|---|---|---|
| 1,121,394 | Patten | Dec. 15, 1914 |
| 1,248,169 | Schnoor | Nov. 27, 1917 |
| 1,608,019 | Fender | Nov. 23, 1926 |
| 1,794,841 | Elreth | Mar. 3, 1931 |
| 1,873,594 | Johnson | Aug. 23, 1932 |
| 2,198,124 | McGill | Apr. 23, 1940 |
| 2,491,645 | Clark et al. | Dec. 20, 1949 |
| 2,594,474 | McGrath | Apr. 29, 1952 |
| 2,672,845 | Schneithorst | Mar. 23, 1954 |
| 2,795,288 | Hirs | June 11, 1957 |
| 2,944,513 | Keely | July 12, 1960 |
| 3,025,831 | Berardi | Mar. 20, 1962 |